Patented Aug. 21, 1928.

1,681,368

UNITED STATES PATENT OFFICE.

FRITZ SEEBACH, OF ERKNER, NEAR BERLIN, GERMANY, ASSIGNOR TO BAKELITE GESELLSCHAFT M. B. H., OF ERKNER, NEAR BERLIN, GERMANY.

PURIFYING PHENOLALDEHYDE RESINS.

No Drawing. Application filed January 21, 1926, Serial No. 82,843, and in Germany January 27, 1925.

The object of the present invention is the obtaining of phenol aldehyde resins, free of acids and other impurities. There exist principally two classes of processes in which the said resins are treated with acids. One of them consists in dissolving the said condensation resins by means of aqueous alkalies and in precipitating them as soluble and fusible resins by means of acids (see French Patent 520,364). Another method consists in treating the said condensation resins with acids whereby the said resins remain soluble and fusible (see German Patents 340,990, Bakelite Gesellschaft and Hessen of the 2nd March 1920, and 410,858, Bakelite Gesellschaft and Hessen of the 5th November 1922). In both cases the resins retain a part of the uncombined phenols, or other undersired by-products. The by-products produced by the by-reaction of aldehydes on the phenols are soluble in water in the presence of alkalies, have a decided odor, and can be transformed into colored products by the action of light and air, but their chemical constitution is not at present known. This disadvantage could be lessened by carrying out the processes with highly diluted solutions which however cause other difficulties, as for instance the necessity of using large vessels, and difficulties in collecting or separating the resins from the liquid.

The present invention consists in causing the acids to act on the condensation resins in the presence of hydrotropic salts (which have the property of rendering substances which, in water, are insoluble or soluble with difficulty, soluble in water (see Neuberg, Biochemische Zeitschrift, volume 76 page 107 and Sitzungsberichte der preussischen Akademie der Wissenschaften 1916 page 1034). Such salts are soluble salts of aromatic acids or of the higher fatty acids, especially sodium salts of salicylic acids or soaps, i. e. the potassium or sodium or ammonium salts of the liquid or solid or semisolid fatty acids, resin acids, wax acids, sulphonated fats or fatty acids, hydroxy fatty acids or halogenated fatty acids. Mixtures of the various alkali metal salts or soaps may also be used.

If, according to the present invention, to highly concentrated solutions (for instance of 40 per cent) of the condensation resins in alkalies soaps are adder and carbon dioxide is introduced, it is possible to obtain a precipitate of the resins free of uncombined phenols and other impurities absorbable by the condensation resins. The salts may be added before, during or after the precipitation of the condensation resins by means of acids. If for instance a soap solution be added to the alkaline solution of the condensation resins before the precipitation it can easily be ascertained from the properties of the precipitated resin when sufficient quantities of the precipitant have been added, the precipitated resin representing a fine sandlike powder. The salts are chosen and their quantities determined so that the resins are precipitated in the before mentioned condition.

The present process may be applied to all phenolaldehyde resins, obtained without condensing agents or with alkali or acid or both these condensing agents as far as the resins have the property of giving solutions by adding water and alkali, also solutions of colloidal character.

*Example 1.*—1 kilogram of phenol aldehyde resin (obtained by the reaction of formaldehyde, its polymers, or acetaldehyde on a phenol as phenol in the proper sense, cresols, naphthols with basic or acid condensating agents) are dissolved in caustic soda solution and water is added until the volume of the liquid will be about 2½ litres. At ordinary temperature carbon dioxide is introduced until the mass, of high viscosity, has become again fluid. Then no more carbon dioxide is added and 150 cubic centimeters of a 5 percentage solution of soda soap are added. On adding the soap solution the gel like mass becomes pulverous and after some minutes it separates from the liquid. The liquid is decanted, the precipitate is filtered, washed with water or soap solution and dried.

*Example 2.*—1 kilogram of phenol formaldehyde resin prepared by means of an acid condensating agent is dissolved with caustic soda to a 40 percentage solution and 1 liter of a 2.5 percentage sodium soap solution added. Carbon dioxide is introduced quickly until the resinous condensation product is precipitated and is deposited at the bottom of the vessel. The precipitate is centrifuged and is washed.

*Example 3.*—1 kilogram of phenol formaldehyde resin prepared partly by alkaline and partly by acid condensation is dissolved with caustic soda, as in the Example 2, precipitated by means of carbondioxide and 1 litre of 2.5 percentage soda soap solution is added as soon as the mixture begins to precipitate. The resin is precipitated from the liquid, washed and allowed to dry.

In the examples also other acids, inorganic or organic, gaseous, liquid or solid, but soluble may be used, as for instance hydrochloric acid, phosphoric acid, acetic acid, benzoic acid, oxalic acid may be used as precipitants. The acids must be so selected that they do not decompose or deteriorate the resins.

I claim:—

1. A process for making alkali soluble phenolaldehyde resins free of acids which consists in dissolving the resins in alkalies, adding to the solutions obtained so-called hydrotropic salts which have the property of rendering difficultly soluble or insoluble substances soluble in water but do not affect the solubility of the phenol resin and precipitating the resins in the presence of the said salts with acids.

2. A process for making alkali soluble resins free of acids which consists in dissolving the resins in alkalies, adding alkali metal soap and precipitating the resins in the presence of the said alkali metal soap with acids.

3. A process for making alkali soluble phenolaldehyde resins free of acids which consists in dissolving the resins in alkalies, adding sodium soap and precipitating the resins in the presence of the said sodium soap with acids.

4. A process for making alkali soluble phenolaldehyde resins free of acids which consists in dissolving the resins in alkalies, adding to the solutions obtained so-called hydrotropic salts which have the property of rendering difficultly soluble or insoluble substances soluble in water but do not affect the solubility of the phenol resin and precipitating the resins in the presence of the said salts with carbon dioxide.

5. A process for making alkali soluble resins free of acids which consists in dissolving the resins in alkalies, adding alkali metal soap and precipitating the resins in the presence of the said alkali metal soap with carbon dioxide.

6. A process for making alkali soluble phenolaldehyde resins free of acids which consists in dissolving the resins in alkalies, adding sodium soap and precipitating the resins in the presence of the said sodium soap with carbon dioxide.

In testimony whereof I hereunto affix my signature.

FRITZ SEEBACH.